(12) United States Patent
Gschwind et al.

(10) Patent No.: US 8,984,042 B2
(45) Date of Patent: Mar. 17, 2015

(54) MIXED PRECISION ESTIMATE INSTRUCTION COMPUTING NARROW PRECISION RESULT FOR WIDE PRECISION INPUTS

(75) Inventors: Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 13/369,470

(22) Filed: Feb. 9, 2012

(65) Prior Publication Data

US 2013/0212139 A1    Aug. 15, 2013

(51) Int. Cl.
| | |
|---|---|
| *G06F 7/38* | (2006.01) |
| *G06F 7/00* | (2006.01) |
| *G06F 15/00* | (2006.01) |
| *G06F 7/483* | (2006.01) |
| *G06F 7/499* | (2006.01) |

(52) U.S. Cl.
CPC ............... *G06F 7/483* (2013.01); *G06F 7/499* (2013.01)
USPC ............................ 708/496; 708/204; 708/498

(58) Field of Classification Search
USPC .................................. 708/496–499, 204–205
See application file for complete search history.

(56) References Cited

U.S. PATENT DOCUMENTS

| | | | | |
|---|---|---|---|---|
| 5,317,526 | A | * | 5/1994 | Urano et al. .................. 708/204 |
| 5,561,615 | A | * | 10/1996 | Kuo et al. ..................... 708/204 |
| 5,630,160 | A | * | 5/1997 | Simpson et al. .............. 708/490 |
| 5,696,711 | A | * | 12/1997 | Makineni ...................... 708/497 |
| 5,761,103 | A | * | 6/1998 | Oakland et al. ............... 708/497 |
| 5,805,475 | A | * | 9/1998 | Putrino et al. ................ 708/204 |
| 2002/0184282 | A1 | * | 12/2002 | Yuval et al. ................... 708/495 |
| 2011/0055307 | A1 | * | 3/2011 | Hurd et al. .................... 708/497 |
| 2012/0124115 | A1 | * | 5/2012 | Ollmann ....................... 708/204 |

OTHER PUBLICATIONS

IBM, "PowerPC® Microprocessor Family: The Programming Environments Manual for 64-bit Microprocessors", Version 3.0, Jul. 2005.*
E. M. Schwarz, M. S. Schmookler, and S. D. Trong, "Hardware implementations of denormalized numbers", IEEE Symposium on Computer Arithmetic, 2003.*
R. E. Fry and M. Nguyen Phu, "Loading of Single Precision Denormalized Number", IBM Research Disclosure n314 06-90, 1990.*

* cited by examiner

*Primary Examiner* — Chat Do
*Assistant Examiner* — Matthew Sandifer
(74) *Attorney, Agent, or Firm* — Cantor Colburn LLP; William A. Kinnaman, Jr.

(57) ABSTRACT

A technique is provided for performing a mixed precision estimate. A processing circuit receives an input of a first precision having a wide precision value. The processing circuit computes an output in an output exponent range corresponding to a narrow precision value based on the input having the wide precision value.

9 Claims, 13 Drawing Sheets

| | Name | Common name | Base | Digits | E min | E max | Notes | Decimal digits | Decimal E max |
|---|---|---|---|---|---|---|---|---|---|
| Row 1 | binary16 | Half precision | 2 | 10+1 | −14 | +15 | storage, not basic | 3.31 | 4.51 |
| Row 2 | binary32 | Single precision | 2 | 23+1 | −126 | +127 | | 7.22 | 38.23 |
| Row 3 | binary64 | Double precision | 2 | 52+1 | −1022 | +1023 | | 15.95 | 307.95 |
| Row 4 | binary128 | Quadruple precision | 2 | 112+1 | −16382 | +16383 | | 34.02 | 4931.77 |
| Row 5 | decimal32 | | 10 | 7 | −95 | +96 | storage, not basic | 7 | 96 |
| Row 6 | decimal64 | | 10 | 16 | −383 | +384 | | 16 | 384 |
| Row 7 | decimal128 | | 10 | 34 | −6143 | +6144 | | 34 | 6144 |

US 8,984,042 B2

MIXED PRECISION ESTIMATE INSTRUCTION COMPUTING NARROW PRECISION RESULT FOR WIDE PRECISION INPUTS

BACKGROUND

The present invention relates to data processing, and more specifically, to mixed precision estimate instruction computing.

The IEEE Standard for Floating-Point Arithmetic (IEEE 754) is a technical standard established by the Institute of Electrical and Electronics Engineers (IEEE) and the most widely used standard for floating-point computation. The current version is IEEE Standard for Floating-Point Arithmetic 754-2008, which was published in August 2008, and is herein incorporated by reference in its entirety. Many computer languages allow or require that some or all arithmetic be carried out using IEEE 754 formats and operations.

The IEEE 754-2008 standard defines: arithmetic formats: sets of binary and decimal floating-point data, which consist of finite numbers (including signed zeros and subnormal numbers), infinities, and special "not a number" values (NaNs); interchange formats: encodings (bit strings) that may be used to exchange floating-point data in an efficient and compact form; rounding algorithms: methods to be used for rounding numbers during arithmetic and conversions; operations: arithmetic and other operations on arithmetic formats; and exception handling: indications of exceptional conditions (such as division by zero, overflow, etc.).

Under exception handling, the standard defines five exceptions, each of which has a corresponding status flag that is raised when the exception occurs. The five possible exceptions are: invalid operation (e.g., square root of a negative number); division by zero; overflow (a result is too large to be represented correctly); underflow (a result is very small (outside the normal range) and is inexact); and inexact.

Single precision floating point format is a computer number format that occupies 4 bytes (32 bits) in computer memory and represents a wide dynamic range of values by using a floating point. In IEEE 754-2008, the 32-bit base 2 format is officially referred to as binary32.

In computing, double precision floating point is a computer number format that occupies two adjacent storage locations in computer memory. A double precision number, sometimes simply called a double, may be defined to be an integer, fixed point, or floating point (in which case it is often referred to as FP64). Modern computers with 32-bit storage locations use two memory locations to store a 64-bit double-precision number (a single storage location can hold a single-precision number). Double-precision floating-point is an IEEE 754 standard for encoding binary or decimal floating-point numbers in 64 bits (8 bytes).

SUMMARY

According to exemplary embodiments, a computer system, method, and computer program product are provided for performing a mixed precision estimate. A processing circuit receives an input of a wide precision having a wide precision value. The processing circuit computes an output in an output exponent range corresponding to a narrow precision value based on the input having the wide precision value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates a table showing IEEE 754-2008 standard number formats for floating point numbers;

DETAILED DESCRIPTION

Figure 2:
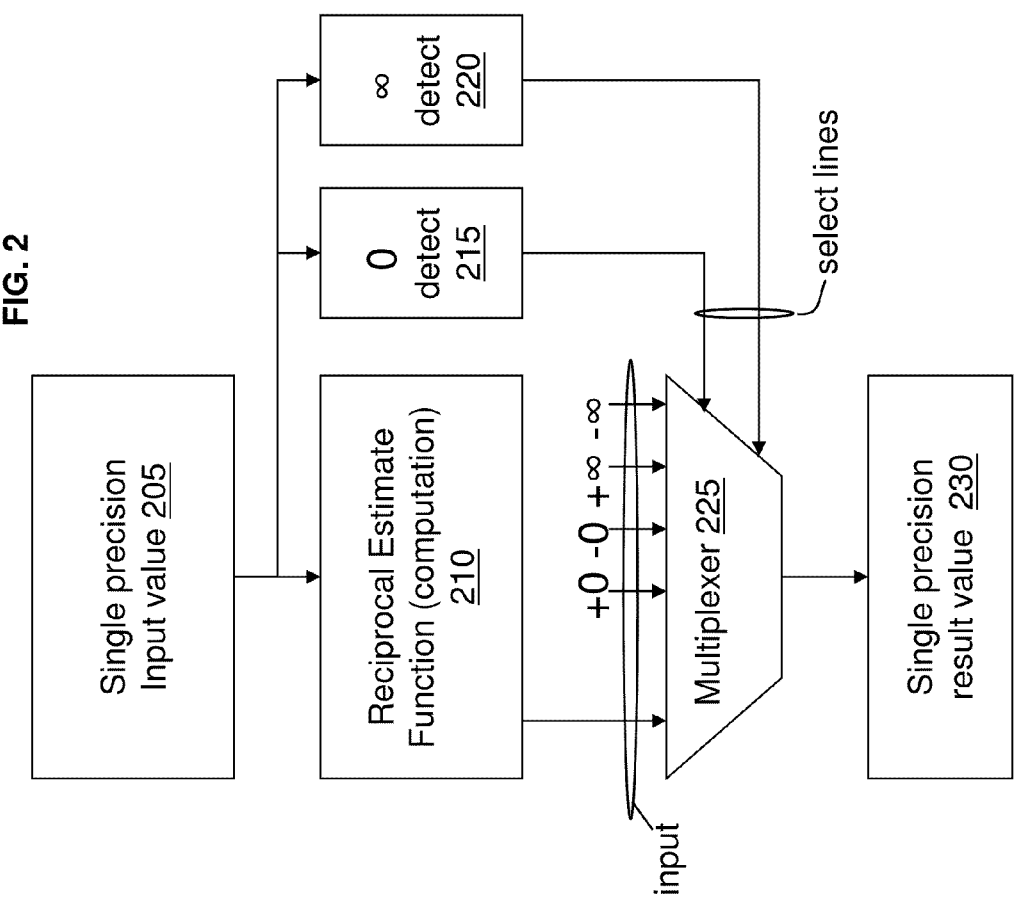
FIG. 2 illustrates a block diagram of executing a computation for a single precision input value to result in a single precision output value.

Exemplary embodiments are configured to execute mixed precision estimate instruction computing. In one implementation, a circuit can receive an input in a double precision format, compute the estimate instruction, and provide an output as a single precision result. The single precision result can be stored in a register according to a single precision format.

IEEE floating point standard 754-2008 specifies support for mixed precision arithmetic. However, support for mixed precision estimate instructions implemented by common instruction sets but not specified by the IEEE standard has not been proposed by those skilled in the art.

Estimate instructions, such as reciprocal estimate (such as, e.g., for 1/x) and reciprocal square root estimate (such as, e.g., 1/√x) are not standardized. They are frequently implemented in accordance with standard instruction sets, such as Power ISA™ of IBM®. The publication of Power ISA™ Version 2.06 Revision B, dated Jul. 23, 2010 is herein incorporated by reference in its entirety. The state of the art has not offered mixed precision processing. Mixed precision processing refers to having an input of one precision such as double precision (e.g., 64 bit precision format) and output of a different precision such as single precision (e.g., 32 bit precision format).

In current implementations, double precision reciprocal estimate instructions and reciprocal square root estimate give a result for double precision inputs. In Power ISA™, double precision reciprocal or square root estimate instructions give a result for single precision inputs when a shared architected register file format is used.

In current implementations, single precision reciprocal estimate instructions and single precision reciprocal square root estimate instructions give a result for single precision inputs. No formats support processing of a mixed precision double to single precision estimate, where a proper single precision result is provided. As incorporated herein by reference, a proper or valid single precision result is defined in IEEE floating point standard 754-2008.

FIG. 1 is a table 100 showing IEEE 754-2008 standard number formats for floating point numbers. Row 1 through row 7 shows the various types of precision that may be used in number format. For example, row 2 shows binary 32 which require 32 bits of memory in a register to store a value, and binary 32 is referred to as single precision. Row 3 shows binary 64 which requires 64 bits of memory in a register to store a value in the memory of register, and binary 64 is referred to as double precision.

For explanation purposes, examples may discuss single precision (32 bits) and double precision (64 bits) as the input value and/or output value, but the disclosure is not meant to be limited.

In accordance with an exemplary embodiment, estimate instructions are provided corresponding to a lower precision that take inputs of another higher precision and range. A result is computed, and an estimate is returned corresponding to a number in the lower precision in accordance with the architecture.

FIG. 2 is a block diagram 200 of executing a computation for a single precision input value to result in a single precision output value.

The single precision input value 205 is input into a reciprocal estimate function 210, a ±zero detect 215, and a ±infinity (∞) detect 220. A multiplexer 225 also referred to as a data selector receives input from the computed reciprocal estimate function 210, +zero, −zero, +infinity, and −infinity. The multiplexer 225 selects the desired input based on whether the zero detect 215 detects a zero and/or whether the infinity detect 220 detects infinity. If nothing is detected by the zero detection 215 and the infinity detect 220, the multiplexer 225 passes the computed value from the reciprocal estimate function 210, and this computed value is a single precision result value 230. Further, logic of the multiplexer 225 is provided in Table 1 below. This logic applies for the zero detect 215 and infinity detect 220 as will be discussed later.

TABLE 1

If (detect_plus_0) then
  output <= plus_infinity;
elseif (detect_minus_0) then
  output <= minus_infinity;

TABLE 1-continued

If (detect_plus_infinity) then
  output <= plus_0;
elseif (detect_minus_infinity) then
  output <= minus_0;
else
  output <= estimate_circuit_result;
end if;

If the reciprocal estimate function 210 calculates, e.g., 1/x or 1/√x, the single precision input value 205 is "x" or "x'". In this case, x is a 32 bit value in the 32 bit single precision format as defined by IEEE 754-2008, and the single precision result value 230 is in the same format. The input value may be retrieved from a register and the output value may be stored in a register. In one embodiment, a single precision estimate circuit may further have logic to handle the replication of a NaN input to a NaN output.

Figure 3:
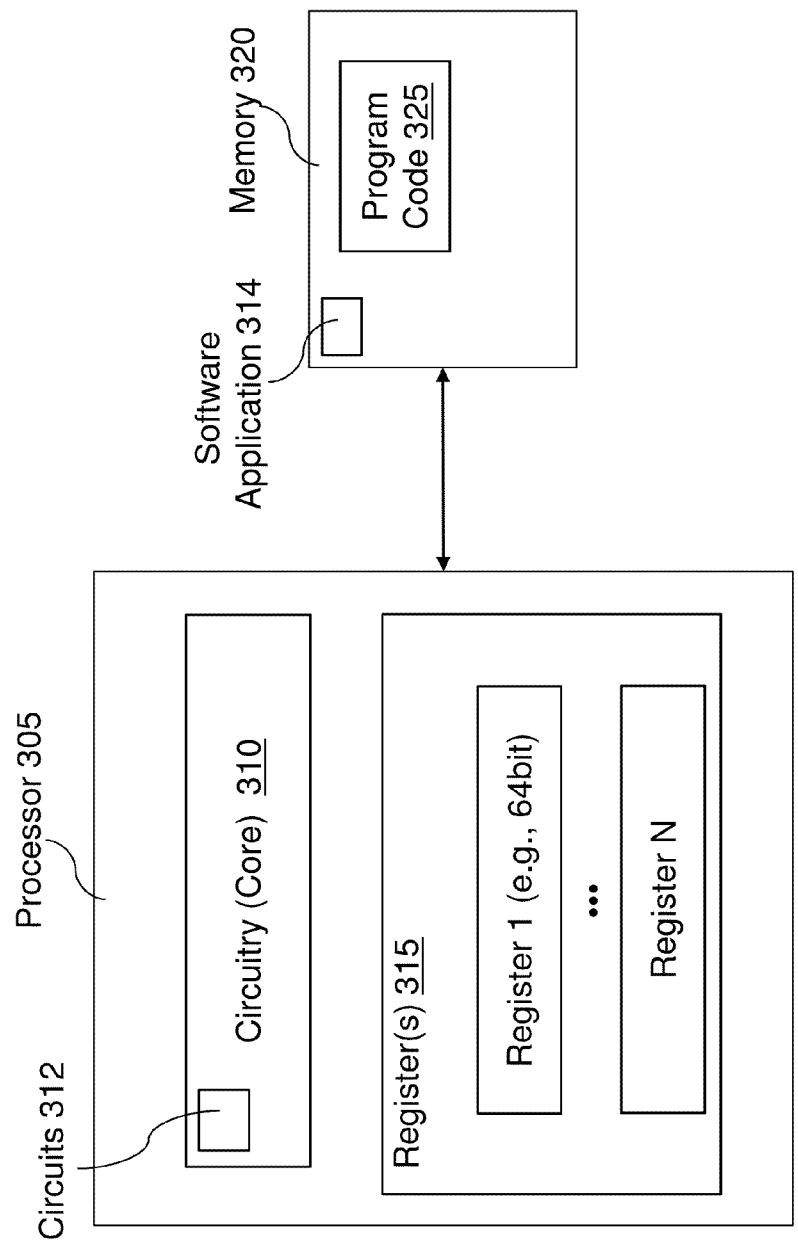
FIG. 3 illustrates a block diagram of a computer system according to an embodiment of the present invention.

Turning now to FIG. 3, a block diagram of a system 300 is generally shown according to an exemplary embodiment. The system 300 includes a processor 305 also referred to as a central processing unit (CPU). The processor 305 has one or more processor cores, and the processor core may be referred to as circuitry 310. The processor 305 may include one or more registers 315. In computer architecture, a processor register is a small amount of storage available as part of a CPU or other digital processor, and data can be loaded into the register 315 from memory 320 for arithmetic manipulation by the circuitry 310.

Circuits 312 are part of the circuitry 310 of the processor 305. The circuits 312 are configured with logical circuits to perform the various arithmetic operations as discussed herein, according to an exemplary embodiment. Additionally, software application 314 is configured with logic to perform the various arithmetic operations as discussed herein, according to an exemplary embodiment. As such, any discussion of operations executed by circuits 312 can also be performed by the software application 314. The memory 320 may include program code 325 as an operating system for the system 300.

Figure 4:
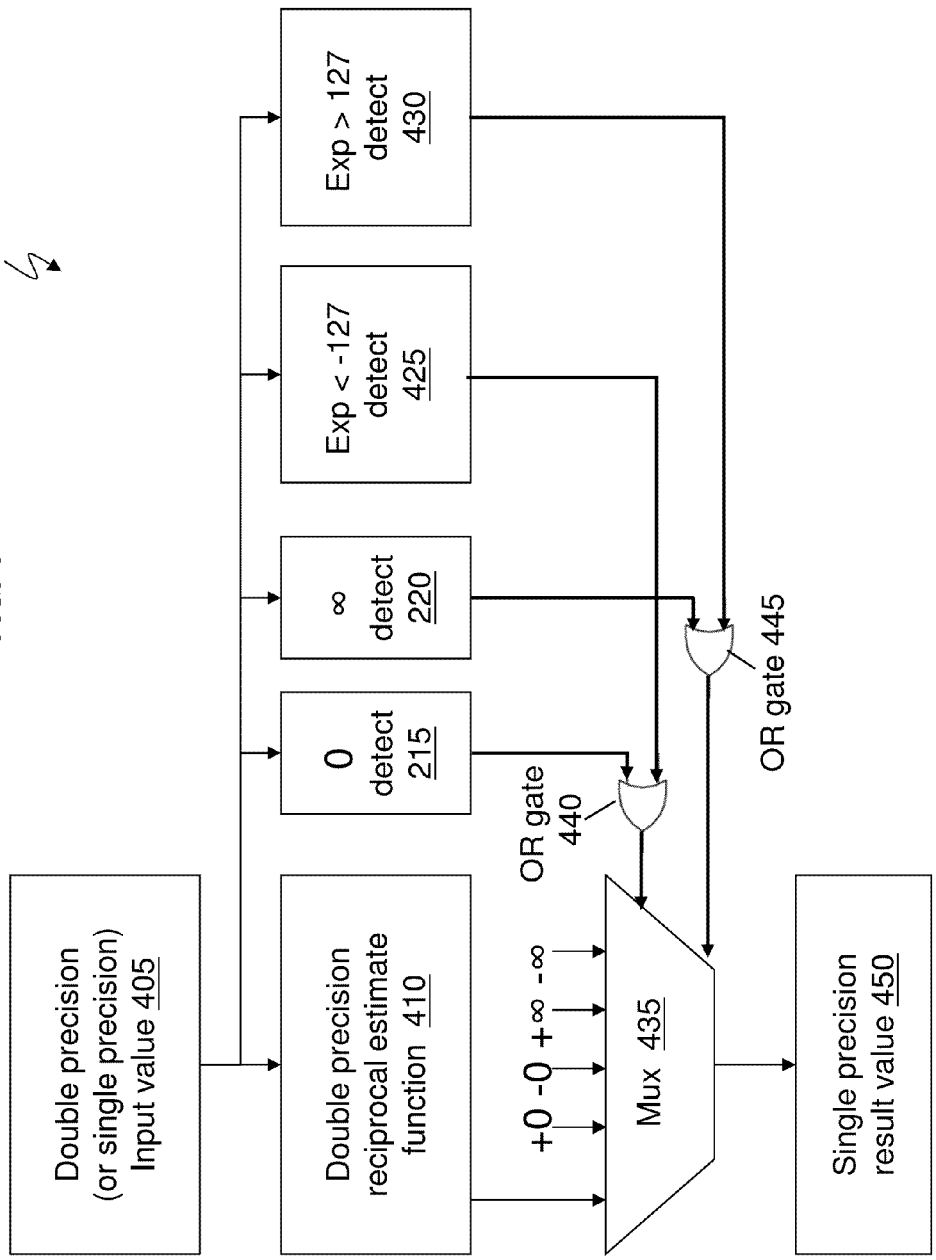
FIG. 4 is a block diagram in which a double precision reciprocal estimate processes a double precision input and returns a single precision result according to an embodiment of the present invention.

FIG. 4 is a block diagram 400 where a double precision reciprocal estimate processes a double precision input and returns a single precision result according to a first embodiment. In FIG. 4, estimate instructions avoid rounding and denormalization circuits commonly used for arithmetic operations, which reduces cost and space when building processor circuits like the processor 305. In FIG. 4, the circuits 312 are configured with the circuits to perform the operations, and the circuits 312 store the output (the number/answer) in the register 315 according to the desired precision format.

The circuits 312 are configured to retrieve a double precision input value 405 from register 1 of registers 315 in a binary 64 bit format. In one case, the circuits 312 are configured to perform/execute blocks 410, 215, 220, 425 and 430 in parallel (i.e., concurrently) and/or nearly parallel. The circuits 312 are configured to execute a double precision reciprocal estimate function 410 (such as, e.g., 1/x or 1/x") according to rules for 32 bit single precision format as defined by IEEE 754-2008. The circuits 312 are configured to perform the ±zero detect 215, and the ±infinity (∞) detect 220. Additionally, the circuits 312 are configured to perform an exponent <−127 detect 425 and an exponent >127 detect 430, where the exponent <−127 detect 425 and the exponent >127 detect 430 define the normalized range. If the circuits 312 detects that the double precision input value 405 has an exponent <−127 (which corresponds to a denormalized single precision number) for which the results of a reciprocal estimate cannot be represented as a normalized single precision number, the circuits 312 are configured to force the single precision result value 450 to infinity (∞) via a multiplexer 435. If the circuits 312 determine that the double precision input value 405 has an exponent >127 in which the double precision reciprocal estimate function 410 is to compute, the circuits 312 are configured to output zero as the single precision result value 450. The circuits 312 operate the zero detect 215 and infinity detect 220 as discussed above in Table 1.

If the detects 215, 220, 425, and 430 are empty, the multiplexer 435 of the circuits 312 are configured to output the calculation (by circuits 312) of the double precision reciprocal estimate function 410 as the single precision result value 450. In at least one embodiment, a reciprocal estimate function returns a limited number of mantissa bits, e.g., 8 or 12 bits.

While this embodiment is generally configured to avoid denormalized result numbers by substituting zero results, the embodiment described herein is equipped to generate a limited range of denormalized results corresponding to denormalized results that may be generated in response to the input of a valid single precision input. Consequently, in one embodiment, there is provided a means to generate said limited range, e.g., by way of a limited form alignment shift that exists in the dataflow to handle generating denormalized estimates for an input exponent equal to 127 (the largest single precision input) in the double precision reciprocal estimate function 410 of the circuits 312. In such an embodiment, the circuits 312 may be configured to handle 1 or 2 bits of denormalization. In another embodiment, no support for handling any denormalized numbers is present in circuit 410. In accordance with such an embodiment, an exponent check 430 (of exp >127 detect 430) may be replaced by an alternate exponent check 430 to check for "exp >126" or "exp >125" to avoid results in the denormalized single precision range.

In one exemplary embodiment, the circuits 312 are configured to perform reciprocal estimate function with not a number processing (NaN) processing in accordance with single precision NaN processing rules configured in the circuits 312.

Figure 5:
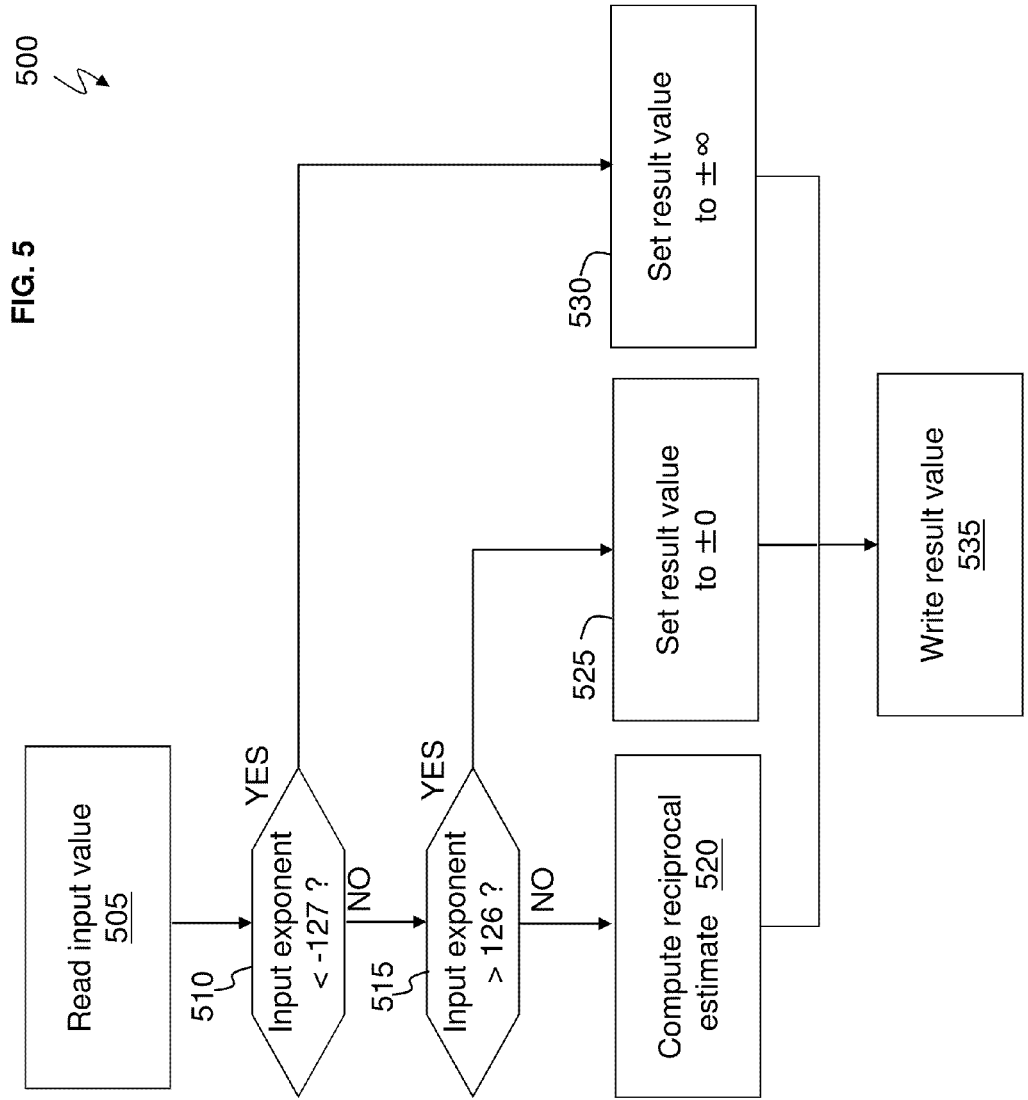
FIG. 5 illustrates a flow chart according to an embodiment of the present invention.

FIG. 5 is a flow chart 500 that corresponds to the block diagram 400 according to the first embodiment. The circuits 312 are configured to calculate the reciprocal estimate for input of one precision (such as 64 bit precision) to provide the output in a different precision (32 bit precision in the single precision format defined IEEE 754-2008).

At block 505, the circuits 312 are configured to read the input value, which may be a 64 bit input value (which corresponds to wide precision). At block 510, the circuits 312 include one or more circuits configured to check whether the input exponent (of the input value) is less than negative 127 (i.e., exp <−127). In response to determining that the input exponent is less than −127, the circuits 312 are configured to set the result value to plus or minus infinity (±∞) at block 530, depending on the sign of the input value. If block 510 is no, the circuits 312 are configured to check whether the input exponent is greater than 126 (i.e., exp >126) at block 515. In response determining that the input exponent is greater than 126, the circuits 312 are configured to set the result value to plus or minus zero (±0) at block 525, depending on the sign of the input value. If block 515 is no, the circuits 312 are configured to compute the reciprocal estimate of the input value at block 520. Computing the reciprocal estimate at block 520 can include the description discussed for diagram 200 in FIG. 2.

At block 535, the circuits 312 are configured to write the result value in a 32 bit format for single precision (in register 315) (according to the IEEE format for 32 bits) even when the input value is provided in 64 bit format. One skilled in the art will understand that the checks and steps can be re-ordered in a number of ways while practicing the teachings contained herein.

In one implementation of the first embodiment, blocks 510, 515, and 520 are executed in parallel (e.g., concurrently or almost concurrently) by the circuits 312. By having blocks 510, 515, 525, and 530, no rounding circuit and no normalization circuit are needed in the circuits 312. Also, the circuits 312 avoid the additional clock cycle(s) (of the processor 305) required for the rounding circuit, and avoid the additional clock cycle(s) required for the normalization circuit.

The circuits 312 may be configured to be specific to instruction sets that represent a narrow precision format (such as 32 bits) as overlays onto a wider precision format of a register (of registers 315), as in the Power® ISA of IBM®.

In one example, results in single precision are represented in a bit pattern corresponding to double precision in the register file (of registers 315) for processing. A number is architecturally a single precision number only if the stored exponent matches the single precision range, and if only bits of the mantissa (also referred to as the fraction and significand) corresponding to bits in the architected single precision format are non-zero.

Figure 6:
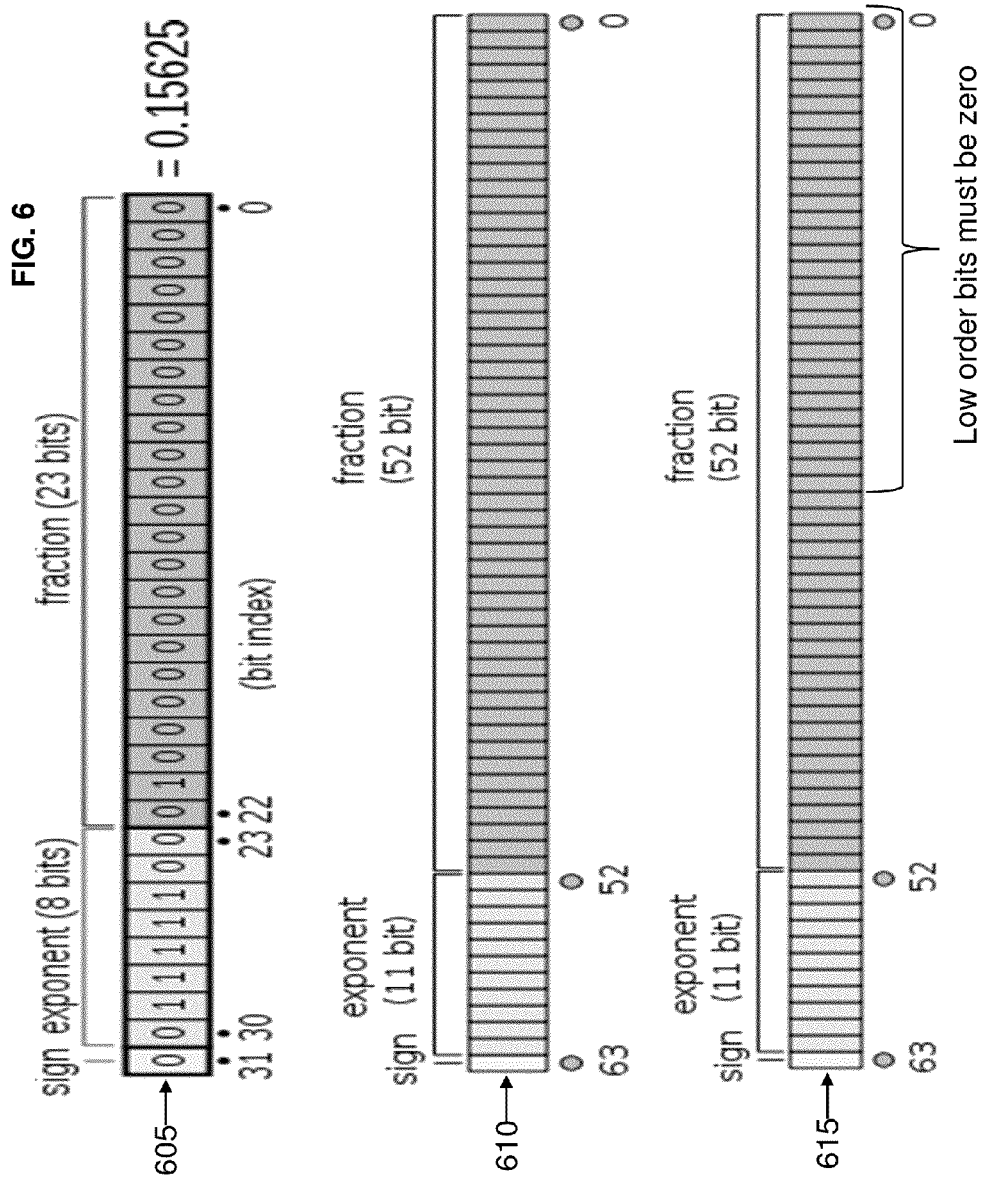
FIG. 6 illustrates a 32 bit register and a 64 bit register according to an embodiment of the present invention.

For example, FIG. 6 illustrates a single precision number in a 32 bit register 605 and a 64 bit register 610 for a double precision number. The circuits 312 are configured to store the single precision number (that would normally be stored in the 32 bit register 605) in the 64 bit register 610. This can be done by converting the single precision exponent to a double precision exponent and by ensuring that the low order 29 mantissa bits (to the right) are zero as shown in the 64 bit register 615. Accordingly, the single precision number is architecturally represented in the architected register file of the 64 bit register 615 (of the registers 315) as a collection of bits corresponding to double precision.

The circuits 312 are configured to store single precision denormalized numbers in an internal format corresponding to double precision numbers in a register of the registers 315. The circuits 312 can store the single precision number as an unnormalized number with an exponent corresponding to exponent =−127 (i.e., not an implicit 0 before decimal). Particularly, in one case, the circuits 312 can store the implicit bit explicitly. Since the single precision number is being stored in a 64 bit register, the circuits 312 are also configured to store the single precision denormalized number as a normalized double precision number in the 64 bit register.

Figure 7:
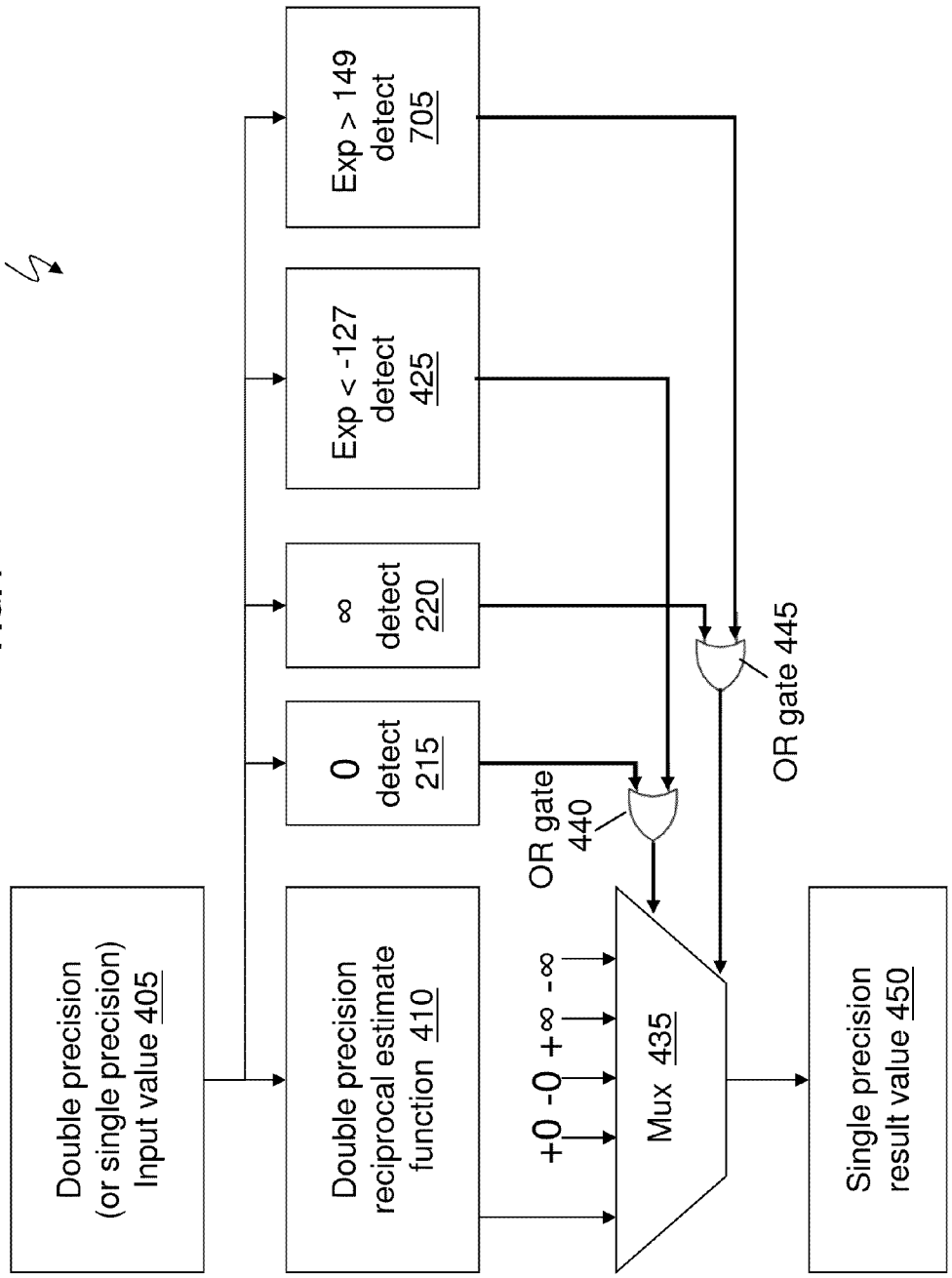
FIG. 7 illustrates a block diagram of how the circuits allow a mantissa with excess precision bits for results corresponding to single precision denormalized numbers according to an embodiment of the present invention.

According to a second embodiment as discussed in FIG. 7, when denormal single precision results are returned (after computing the reciprocal estimate), the denormal numbers are stored (by the circuits 312) in a register file format (of the register 315) having wider precision (e.g., 64 bits), but the circuits 312 allow the mantissa (i.e., fraction) to have excess precision bits (i.e., more than the mantissa bits for single precision as set forth in IEEE 754-2008) for results corresponding to single precision denormalized numbers, corresponding to less than 23 bits for denormalized numbers depending on the effective exponent of the denormalized single precision number (and less than the number of bits returned by 410). In computer science, denormal numbers or denormalized numbers (often called subnormal numbers) fill the underflow gap around zero in floating point arithmetic: any non-zero number which is smaller than the smallest normal number is 'sub-normal'. For example, if the smallest positive 'normal' number is $1\times\beta^{-n}$ (where β is the base of the floating-point system, usually 2 or 10 and n is the exponent), then any smaller positive numbers that can be represented are denormal.

In accordance with the present definition of computing a mixed precision result, in first embodiment, a result is generated in the internal format that meets the exponent range requirements of a single precision format.

However, in the second embodiment, for a generated result, excessive mantissa bits that are non-zero are generated by the circuits 312. In accordance with a floating point unit including such an embodiment, instructions operating on "single precision" numbers are either (1) equipped to process such inputs and compute and round an accurate result based on the full mantissa width presented, (2) or equipped to round or truncate such numbers prior to processing. In particular, an example of (1) may be an instruction handling mixed-mode arithmetic and processing the input similar to a double precision mantissa, and an example of (2) may be the Power® ISA single precision floating point store.

Turning to FIG. 7, a block diagram 700 illustrates how the circuits 312 allow a mantissa (i.e., fraction) with excess precision bits for results corresponding to single precision denormalized numbers according to the second embodiment.

The circuits 312 are configured to read the input value 405. As discussed above, the circuits 312 are configured to execute the zero detect 215, execute the infinity detect 220, execute the exponent less than negative 127 detect 425, and compute the double precision reciprocal estimate function 410 in parallel; additionally (in parallel), the circuits 312 are configured to execute an input exponent greater than 149 detect 705. In the first embodiment, the input exponent could not be greater than 127, in which case the single precision result value 450 would have been designated as zero in the register. However, in the second embodiment, the input exponent is checked and has to be greater than 149 before the circuits 312 designate the single precision result value 450 as zero (0).

In accordance with one aspect of a microprocessor and more specifically a floating point unit support an embodiment generating excessive mantissa bits associated with a result in single precision denormalized result are handled by a single precision instruction accepting double precision inputs, with a result rounded or truncated to single precision in accordance with the IEEE 754 standard and augmented by the teachings herein. In another aspect, a result is truncated when it is provided as an input to a single precision instruction, e.g., in accordance with the Power ISA floating point single store instruction.

In one case of the second embodiment, only one number with input exponent=149 (e.g., $1 \cdot 2^{149}$) can be represented with a non-zero denormalized result value. The cut off may be performed accordingly at input exponent >148.

In accordance with a third embodiment, denormal (i.e., denormalized) single precision results are returned, where the denormalized single precision results are represented (by the circuits 312) in an architected register file format (in a register of the registers 315) corresponding to a wider precision (such as a 64 bit format), and the range of both the exponent and the precision of mantissa bits are restricted to numbers representable in a narrower format (such as a 32 bit format). In the third embodiments, the circuits 312 are allowed to deviate from the exact storage format for 32 bit single precision. Note that in FIG. 6, bit 0 through 22 are the 23 fraction/mantissa bits, bits 23 through 30 are the 8 exponent bits, and bit 31 is the sign bit; this format is slightly modified for storing the single precision result value in a 64 bit register, but the total amount of bits is still 32 bits as seen below.

Single precision denormalized values are represented in double precision non-denormalized number format (which is a double precision normalized number format). For example, when single precision denormalized numbers are represented in an architected wide format (64 bit register), and de-normalized narrow format numbers are represented in a normalized format, then only a limited number of bits can correspond to the native single precision format illustrated in the 32 bit register 605. For example, Table 2 provides bit accuracy for the input exponent of the input value and how the circuits 312 restrict the bits of the mantissa to account for input exponents from −128 to −149, which exceed the single precision format of mantissa bits. By using an extra exponent bit in the 64 bit register (which has 11 exponent bits available), the circuits 312 store a denormalized single precision result in a 64 bit register (of the registers 315) according to Table 2.

| Bit accuracy in Table 2: | |
|---|---|
| Exp = −126 | 23 mantissa bits + 1 implicit bit |
| Exp = −127 | 23 mantissa bits + 1 implicit bit |
| Exp = −128 | 22 mantissa bits + 1 implicit bit |
| Exp = −129 | 21 mantissa bits + 1 implicit bit |
| ... | |
| Exp = −149 | 1 mantissa bit + 1 implicit bit |

In state of the art, the single precision denormalized number would have been generated to denorms and been subjected to a rounding step at a predefined position corresponding to 23 mantissa bits.

However, to avoid the need for the normalization and denormalization alignment shift (i.e., to avoid utilizing a normalization circuit and a denormalization circuit in the circuitry 310 of the processor 305), a mask is applied (by the circuits 312) to the mantissa. In accordance with the third embodiment, the rounding and/or truncation (corresponding to a round towards zero) mask can be generated in parallel with the computation of the floating point result, and be based on the input exponent.

Figure 8:
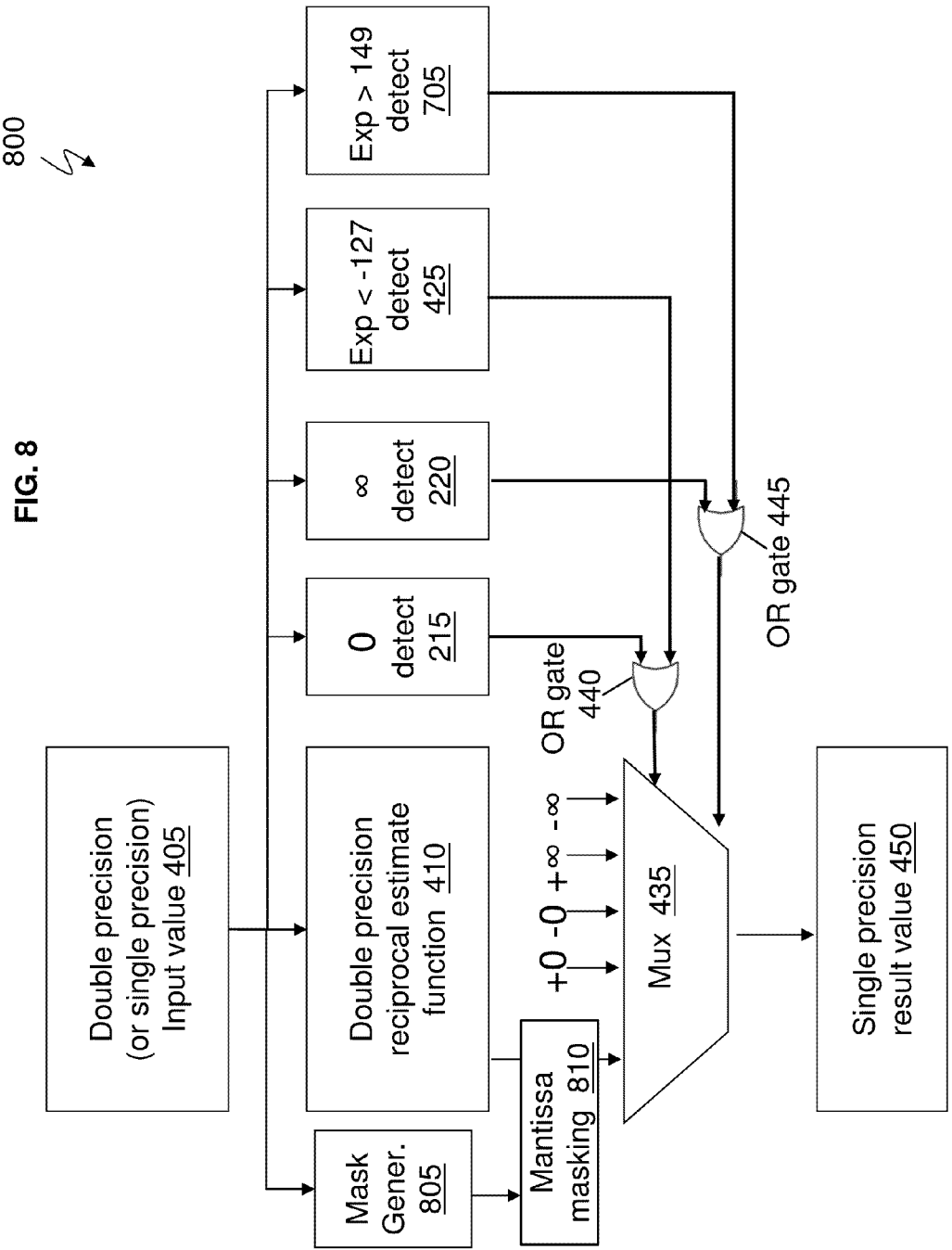
FIG. 8 illustrates a block diagram that generates and applies a mantissa mask to an output according to an embodiment of the present invention.

Turning to FIG. 8, a block diagram 800 shows the third embodiment which builds on the first and second embodiments. In the diagram 800, the circuits 312 load the input value 405 from one of the (64 bit format) registers 315. Since the (same) circuits 312 are configured for mixed precision inputs and outputs, the input value 405 can be a double precision 64 bit number and/or a single precision 32 bit number. Assume that in this case, the input value is a double precision number of a form such that after the computation the output would result in a single precision denormalized number (this would require a separate rounding circuit and denormalization circuit in the state of the art system).

As discussed above for the input value 405, the circuits 312 are configured to execute the zero detect 215, execute the infinity detect 220, execute the exponent less than negative 127 detect 425, execute an input exponent greater than 149 detect 705, and compute the double precision reciprocal estimate function 410 in parallel. Additionally (in parallel), the circuits 312 are configured to execute the mask generation 805 for the mantissa bits to be represented in a 32 bit format. The fraction (i.e., mantissa) bits are limited to 23 bits as shown in the 32 bit register 605 in FIG. 6. However, the circuits 312 (in the third embodiment) allow the input exponent to be greater than 125 (up to 148) without a rounding circuit and/or denormalization circuit by utilizing the additional exponent bits (e.g., 1 exponent bit) that are available in the 64 bit register (of the registers 315). Note that the single precision format (32 bits) only has 8 bits available for the exponent, while a number stored in double precision format has 11 exponent bits available as shown in FIG. 6. To represent the computed output (i.e., the answer computed by the double precision reciprocal estimate function 410) of a number with an input exponent greater 127 but less than 149 that was the input value 405, the circuits 312 utilize an additional exponent bit from the 64 bit format because the results are stored in a 64 bit register of the registers 315. Unlike in an embodiment using a denomalized internal representation, the full mantissa is available for storing non-zero mantissa bits which may lead to excess precision, in accordance with the second embodiment. Assume that the double precision reciprocal estimate function 410 (e.g., the computation circuit of the circuits 312) has calculated a value that is too large (or too small) to be represented in the 32 bit format in 32 bit register 605 and does not violate the blocks 215, 220, 425, and 705. In accordance with the third embodiment, the circuits 312 apply the mantissa mask to the mantissa of the output number of the double precision reciprocal estimate function 410 during mantissa masking 810, while using an extra bit of the exponent bits (e.g., 9 exponent bits instead of 8 exponent bits). The output after mantissa masking 810 results in the single precision result value 450. This single precision result value 450 is stored in the 64 bit register in a 32 bit register format by using mantissa masking 810.

In accordance with the mantissa masking feature disclosed herein, the number of non-zero mantissa bits of an internal double precision representation is reduced to the number of non-zero mantissa bits available in a single precision denormalized number, when the double precision representation represents this value as a normalized double precision value. Thus, mantissa masking ensures generation of single precision results without excess mantissa bits.

Figure 9:
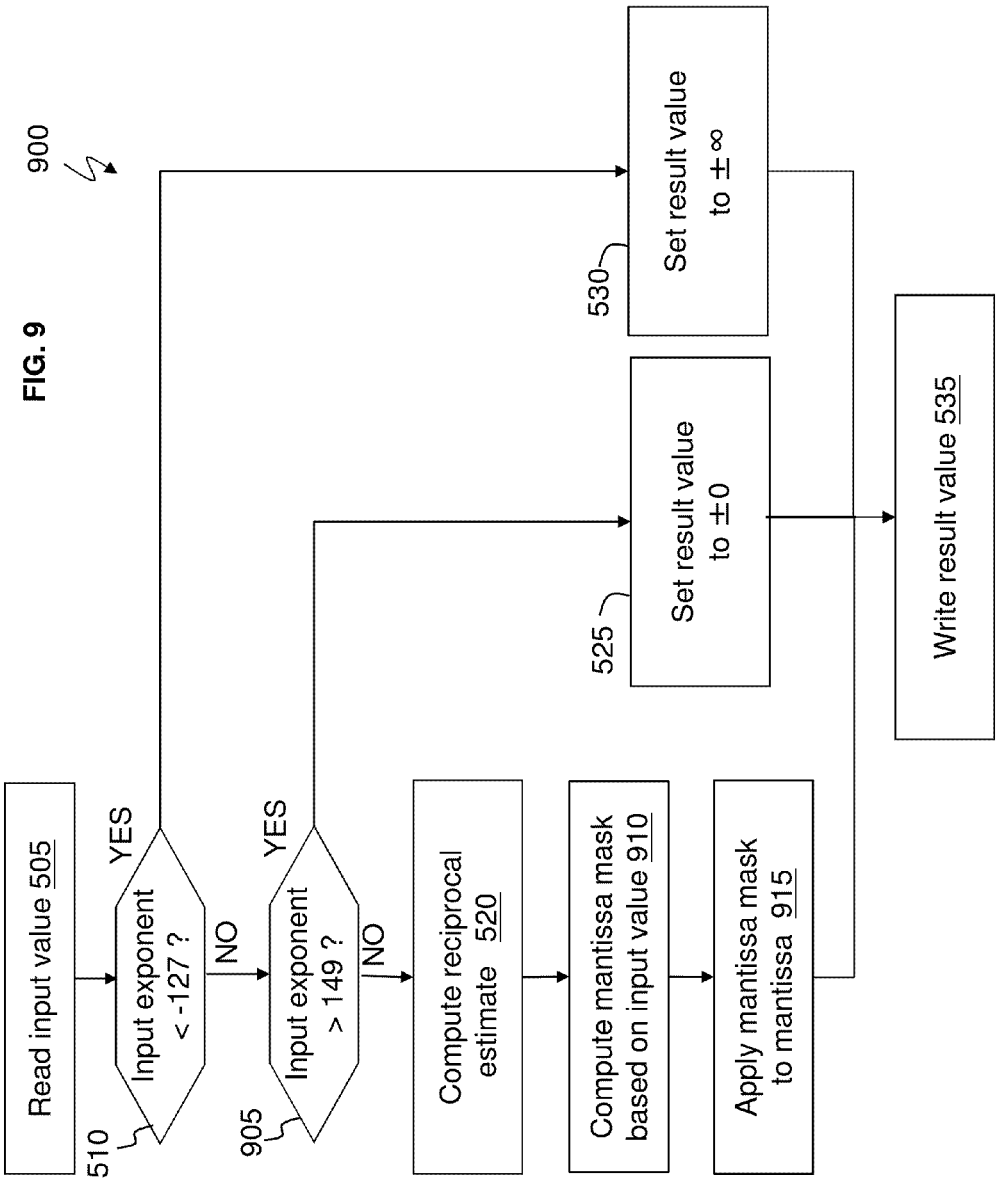
FIG. 9 illustrates a flow chart for computing the mantissa mask and applying the mantissa mask to the computed reciprocal estimate according to an embodiment of the present invention.

In accordance with the third embodiment, FIG. 9 is a flow chart 900 of the circuits 312 computing the mantissa mask and applying the mantissa mask to the computed reciprocal estimate, while using an extra exponent bit. As can be seen, the third embodiment builds on features discussed in the first and second embodiments.

The circuits 312 read the input value 505. The circuits 312 check whether the input exponent is less than −127 at block 510. When circuits 312 determine that the input exponent is less than −127, the circuits 312 set the result value to infinity at block 530, and write the result value in the register 315 at block 535. When the circuits 312 determine that the input exponent is not less that −127, the circuits 312 check whether the exponent of the input value is greater than 149 at block 910. When circuits 312 determine that the input exponent is greater than 149, the circuits 312 set the result value to 0 at block 525 and write the result value in the register 315 at block 535. When the circuits 312 determine that the input exponent is not greater than 149, the circuits 312 compute the reciprocal estimate at block 520.

In a case when the input exponent is greater than 127 but less than 149 and the result value needs to be in single precision format (i.e., 32 bits), rounding would be required for the number (which is too large) computed by the compute reciprocal estimate at block 520. However, the circuits 312 are configured to compute a mantissa mask based on the input value at block 910. The circuits 312 apply the mantissa mask to the mantissa (i.e., the fraction part) of the computed reciprocal estimate at block 915. The circuits 312 write the result value in the 64 bit register of the registers 315 at block 535. Based on the particular input exponent of the input value, the circuits 312 use, e.g., 9 exponent bits to store the (large) result value and zeros the corresponding amount bits in the mantissa. The circuits 312 may execute blocks 510, 905, 520, and 910 in parallel (i.e., concurrently or almost currently).

For each input value, there is a predefined number of mantissa bits that are to have zeros (0s) to maintain a total of 32 bits, such that the result value can be presented (from the storage in register) to the user or to a computer program according to the IEEE 754-2008 single precision format, even though 9 exponent bits are used to store the result value in 64 bit register of the registers 315. Since only a total of 32 bits are used, the circuits 312 convert the 9 exponent value back to an 8 exponent value to be in accord with the 32 bit format as shown in FIG. 6 when a 32 bit format must be presented.

An exemplary embodiment of conversion to convert a 9 bit exponent in accordance with a double precision format to an 8 bit exponent is shown herein in Table 3, where WORD0:31 is the 32b single precision word and DWORD0:63 is the 64b input double precision double word:

TABLE 3

| No Denormalization Required (includes Zero/Infinity/NaN) |
| --- |
| if DWORD1:11 > 896 or DWORD1:63 = 0 then<br>WORD0:1 <= DWORD0:1<br>WORD2:31 <= DWORD5:34 |
| Denormalization Required |
| if 874 ≤ DWORD1:11 ≤ 896 then<br>sign <= DWORD0<br>exp <= DWORD1:11 − 1023<br>frac0:52 <= 0b1 ∥ DWORD12:63<br>denormalize operand<br>do while exp < −126<br>frac0:52 <= 0b0 ∥ frac0:51<br>exp <= exp + 1<br>WORD0 <= sign<br>WORD1:8 <= 0x00<br>WORD9:31 <= frac1:23<br>else WORD <= undefined |

Table 4 shows an example of the mantissa mask logic to be applied to the mantissa bits (52 mantissa bits) allocated in the 64 bit register, when the result value is being written according to single precision.

TABLE 4

| Mantissa mask logic: |
| --- |
| For i = 0 to 52<br>    Mantissa_out(i) <= mantissa_in(i) AND<br>    mantissa_mask(i)<br>End for |

For each bit position in the 53 bit mantissa, the input bit of mantissa_in of a position is ANDed with a corresponding bit position mask bit, to yield an output mantissa bit for that bit position. One skilled in the art would understand how to adapt bit masking to scenarios with mantissas of different widths according to the teachings herein.

In order to avoid the delay of computing a mask from the output exponent, when the output exponent has been determined, the output mantissa mask is computed from the input exponent (by the circuits 312) as shown in Table 5 to be applied to a normalized register file representation in a wider double precision format corresponding to a denormalized architected single precision result.

TABLE 5

| Exp <= 125 | 23 mantissa b + 1 implicit b |
| --- | --- |
| Exp = 126 | 22 mantissa b + 1 implicit b |
| Exp = 127 | 21 mantissa b + 1 implicit b |
| Exp = 128 | 20 mantissa b + 1 implicit b |
| . . . | |
| Exp = 148 | 0 mantissa b + 1 mantissa b |

Figure 11:
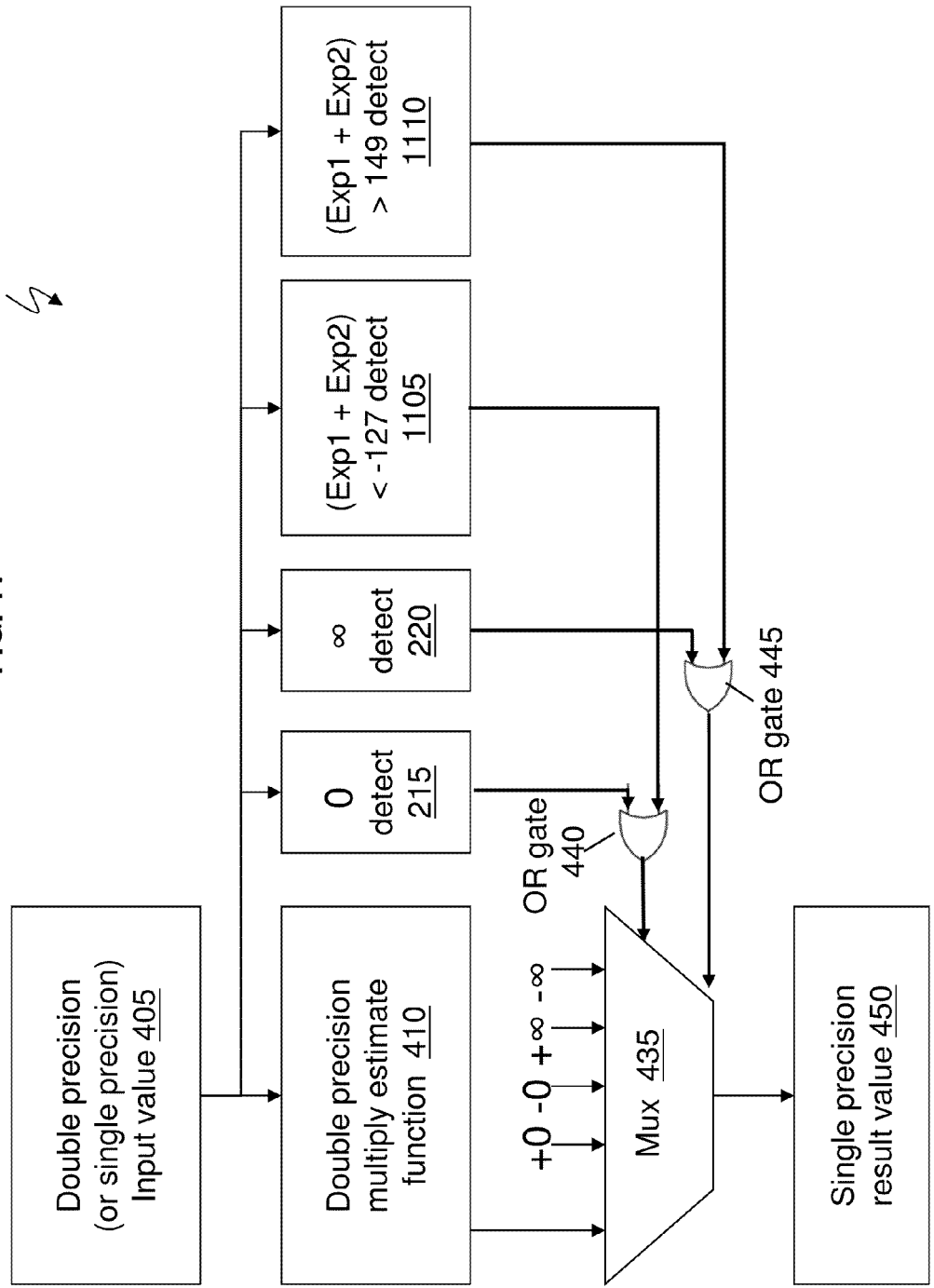
FIG. 11 illustrates a block diagram of a double precision multiply estimate function according to an embodiment of the present invention.

As can been seen in Table 5, as the input exponent increases the circuits 312 correspondingly reduce the bits utilized in the mantissa because the circuits 312 use an extra exponent bit (i.e., 9 exponent bits instead of 8 exponent bits) when storing the single precision result value in the 64 bit register. Reducing the bits of mantissa allows the single precision result value to only use 32 bits total even though the exponent format is not stored in the 8 exponent bit format of IEEE 754-2008 for single precision (as shown in FIG. 11).

Figure 10:
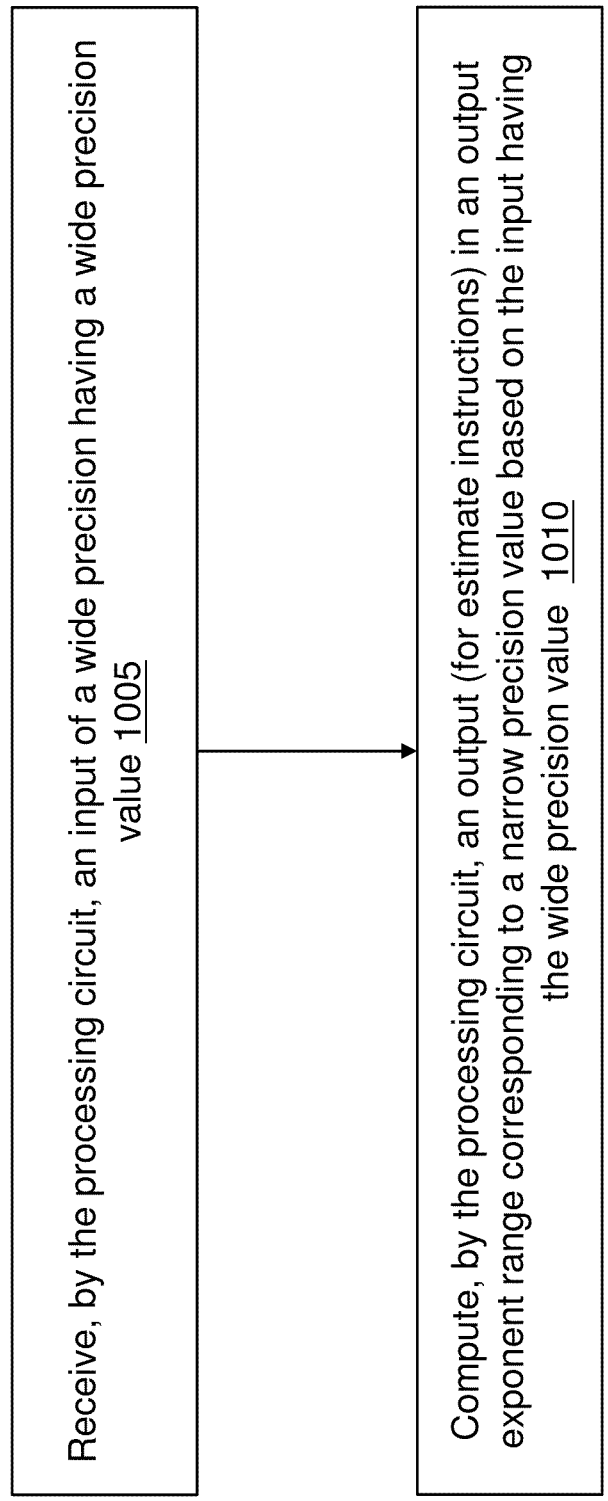
FIG. 10 illustrates a method for reciprocal estimate (computation) with mixed precision according to an embodiment of the present invention.

FIG. 10 illustrates a method 1000 to perform mixed precision estimate executed by the circuits 312 according to an embodiment. Note that although the circuits 312 have been identified as performing certain functions (e.g., wired with hardware components to execute as discussed herein) for explanatory purposes, the circuits 312 are part of the circuitry 310 (the hardware forming the processor core). Any discussion of the circuits 312 applies to the circuitry 310, both of which form the processor 305 (i.e., the processing circuit).

The circuits 312 receive an input of a first precision having a wide precision value at block 1005. The input may be a double precision value in a 64 bit format. The circuits 312 compute an output (for estimate instructions, such as reciprocal estimate (e.g., for 1/x) and reciprocal square root estimate (e.g., 1/√x)) in an output exponent range corresponding to a narrow precision value based on the input corresponding to the wide precision value at block 1010. The output with the narrow precision value may be a single precision value in a 32 bit format.

The circuits 312 store the output in a 64 bit register of the registers 315 where the architected register storage format of the register is in a wide precision format (i.e., 64 bit register format).

Based on the wide precision value of the input having an input exponent failing to correspond to the output exponent range (e.g., failing blocks 425, 430, 510, 515, 705, and/or 905), the circuits 312 generate the output as an out of range value. The out of range value comprises zero and/or infinity.

Based on the input comprising a wide not a number (NaN), the circuits 312 convert the wide not a number to a narrow not a number in which not a number properties are preserved. In accordance with one embodiment, a NaN value is computed by generating a NaN mantissa consisting of the first 23 NaN mantissa bits of a wide input NaN. In one case, the low order bits are masked and ORed into a single bit position of the result NaN mantissa, which would otherwise consist of a mantissa consisting only of zeros. In another embodiment, the result mantissa is set to a pre-defined NaN mantissa value when truncation would otherwise yield an all zero mantissa.

Based on the input having the wide precision value with an input exponent failing to adhere to a valid exponent range of a valid single precision value (e.g., the input exponent is greater that 127 but less than 149), the circuits 312 generate a mantissa mask based on the input exponent to be applied to a mantissa of the output (as discussed in blocks 805, 810, 910, and 915). Also, the circuits 312 add an additional exponent bit beyond eight exponent bits (for the 32 bit register format of register 605) to account for the input exponent failing to adhere to the valid exponent range of the valid single precision value, and the circuits 312 apply the mantissa mask to the mantissa of the output to reduce mantissa bits according to a degree in which the input exponent fails to adhere to the valid exponent range. The circuits 312 store the output (number) in a sixty-four bit register with the additional exponent bit beyond eight exponents bits and with the mantissa of the output reduced, such that the output with the additional exponent bit equals to thirty-two bits for single precision while stored by having the mantissa reduced (as discussed in Tables 3 and 4). The circuits 312 present the output (from the 64 bit register) as the narrow precision value with the eight exponent bits, and the valid exponent range corresponds to the eight exponent bits.

Various examples have been applied for computing reciprocal estimates for mixed precision, but the disclosure is not meant to be limited. A fourth embodiment discusses mixed precision multiply-estimate instruction for computing single precision result for double precision inputs.

Turning to FIG. 11, a block diagram 1100 illustrates an exemplary double precision multiply estimate function 1105 that processes a double precision input for input value 405 and returns a single precision result value 450 according to the fourth embodiment. Denormal inputs are flushed to 0.

Estimate instructions of the double precision multiply estimate function 1105 avoid rounding and denormalization circuits commonly used for arithmetic operations. An example of multiply estimate is $(x^n) \cdot (y^m)$.

In accordance with the fourth embodiment, no denormal single precision results are returned because the exponent 1 plus exponent 2 less than −127 detect 1110 will check for such exponents, and numbers outside the normalized range are "flushed" to zero when a double precision number is an input for which the result of a multiply estimate cannot be represented as a normalized single precision number.

The exponent 1 plus exponent 2 greater than 127 detect checks for input exponents greater than 127, and the circuits 312 set the single precision result value 450 to infinity. As discussed herein, when the input exponent exceeds the range (e.g., if less than −127 or greater than 127), a force to pre-defined value (one of +0, −0, +infinity and −infinity) is performed by the circuits 312.

Figure 12:
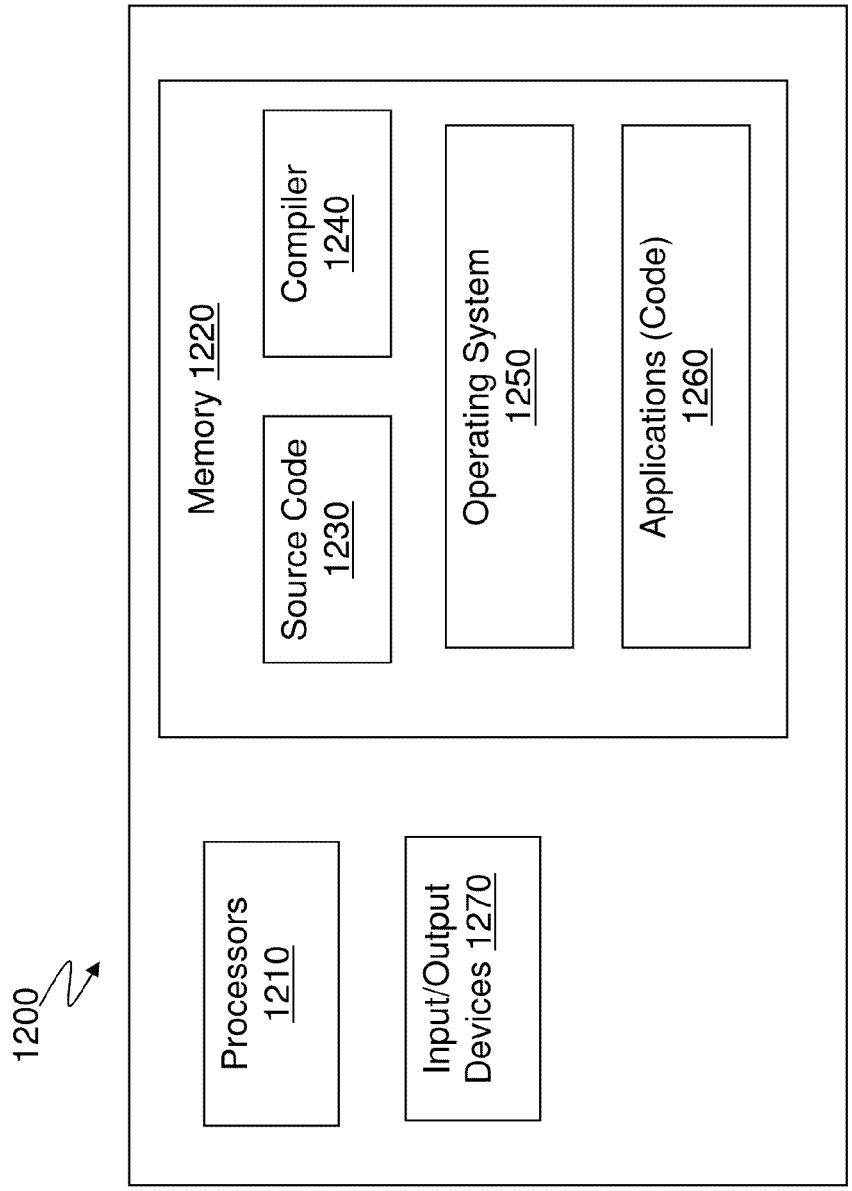
FIG. 12 illustrates an example of a computer having capabilities, which may be utilized in accordance with embodiments of the present invention.

FIG. 12 illustrates an example of a computer 1200 having capabilities, which may be included in exemplary embodiments. Various methods, procedures, modules, flow diagrams, tools, application, circuits, elements, and techniques discussed herein may also incorporate and/or utilize the capabilities of the computer 1200. Moreover, capabilities of the computer 1200 may be utilized to implement features of exemplary embodiments discussed herein. One or more of the capabilities of the computer 1200 may be utilized to implement, to connect to, and/or to support any element discussed herein (as understood by one skilled in the art) in FIGS. 1-11 and 13.

Generally, in terms of hardware architecture, the computer 1200 may include one or more processors 1210, computer readable storage memory 1220, and one or more input and/or output (I/O) devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a macroprocessor.

The computer readable memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the computer readable memory 1220 may include one or more separate programs, each of which comprises an ordered listing of executable instructions for implementing logical functions. The software in the memory 1220 includes a suitable operating system (O/S) 1250, compiler 1240, source code 1230, and one or more applications 1260 of the exemplary embodiments. As illustrated, the application 1260 comprises numerous functional components for implementing the features, processes, methods, functions, and operations of the exemplary embodiments. The application 1260 of the computer 1200 may represent numerous applications, agents, software components, modules, interfaces, controllers, etc., as discussed herein but the application 1260 is not meant to be a limitation.

The operating system 1250 may control the execution of other computer programs, and provides scheduling, input-output control, file and data management, memory management, and communication control and related services.

The application(s) 1260 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the O/S 1250. Furthermore, the application 1260 can be written as (a) an object oriented programming language, which has classes of data and methods, or (b) a procedure programming language, which has routines, subroutines, and/or functions.

The I/O devices 1270 may include input devices (or peripherals) such as, for example but not limited to, a mouse, keyboard, scanner, microphone, camera, etc. Furthermore, the I/O devices 1270 may also include output devices (or peripherals), for example but not limited to, a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or an intranet. The I/O devices 1270 may be connected to and/or communicate with the processor 1210 utilizing Bluetooth connections and cables (via, e.g., Universal Serial Bus (USB) ports, serial ports, parallel ports, FireWire, HDMI (High-Definition Multimedia Interface), etc.).

When the computer 1200 is in operation, the processor 1210 is configured to execute software stored within the memory 1220, to communicate data to and from the memory 1220, and to generally control operations of the computer 1200 pursuant to the software. The application 1260 and the O/S 1250 are read, in whole or in part, by the processor 1210, perhaps buffered within the processor 1210, and then executed.

When the application 1260 is implemented in software it should be noted that the application 1260 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1260 can be embodied in any computer-readable medium 1220 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a non-exhaustive list) of the computer-readable medium 1220 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 1260 is implemented in hardware, the application 1260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1200 includes non-limiting examples of software and hardware components that may be included in various devices, servers, and systems discussed herein, and it is understood that additional software and hardware components may be included in the various devices and systems discussed in exemplary embodiments.

Figure 13:
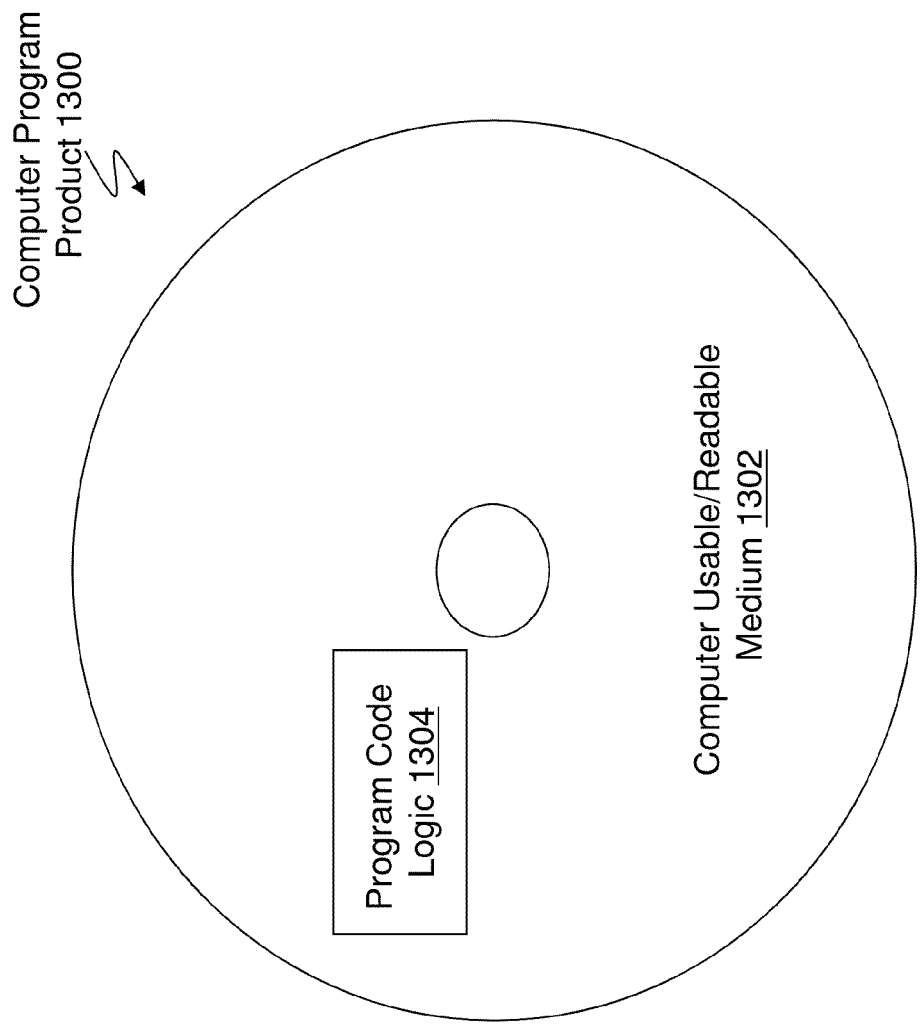
FIG. 13 illustrates an example of a computer program product on a computer readable/usable medium according to an embodiment of the present invention.

As described above, embodiments can be embodied in the form of computer-implemented processes and apparatuses for practicing those processes. An embodiment may include a computer program product 1300 as depicted in FIG. 13 on a computer readable/usable medium 1302 with computer program code logic 1304 containing instructions embodied in tangible media as an article of manufacture. Exemplary articles of manufacture for computer readable/usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for performing a mixed precision estimate, the computer program product comprising:
   a non-transitory storage medium readable by a computer having a processing circuit and storing instructions for execution by the computer, wherein the computer comprises a wide precision format register having an architected register storage format in a wide precision format and extra exponent bits compared to a narrow precision format register having an architected register storage format in a narrow precision format, and wherein executing the instructions comprises:
   receiving, by the processing circuit, a floating-point input of a wide precision having a wide precision value;
   computing, by the processing circuit, a floating-point output of an estimate operation in an output exponent range corresponding to a narrow precision value based on the input having the wide precision value;
   generating, by the processing circuit, a mantissa mask from the input exponent based on the input having the wide precision value with an input exponent failing to adhere to a valid exponent range of a valid single precision value;
   applying, by the processing circuit, the mantissa mask to a mantissa of the floating-point output before storage, wherein the mantissa mask formats the output to take any of the extra exponent bits in the wide precision format register, while relinquishing a corresponding amount of mantissa bits, thereby maintaining the output in the output exponent range corresponding to the narrow precision value; and
   storing, by the processing circuit, the formatted output having the narrow precision value in the wide precision format register having the architected register storage format in the wide precision format.

2. The computer program product of claim 1, wherein the method further comprises based on the wide precision value of the input having an input exponent failing to correspond to the output exponent range, generating the output as an out of range value.

3. The computer program product of claim 2, wherein the out of range value comprises at least one of zero and infinity.

4. The computer program product of claim 1, wherein the method further comprises based on the input comprising a wide not a number (NaN), converting the wide not a number to a narrow not a number in which not a number properties are preserved.

5. The computer program product of claim 1, wherein the method further comprises adding an additional exponent bit beyond eight exponent bits to account for the input exponent failing to adhere to the valid exponent range of the valid single precision value; and
   applying the mantissa mask to the mantissa of the output to reduce mantissa bits according to a degree in which the input exponent fails to adhere to the valid exponent range.

6. The computer program product of claim 5, wherein the method further comprises storing the output in a sixty-four bit register with the additional exponent bit beyond the eight exponent bits and with the mantissa of the output reduced;
   wherein the output with the additional exponent bit equals to thirty-two bits for single precision while stored by having the mantissa reduced;
   wherein the processing circuit is configured to present the output as the narrow precision value with the eight exponent bits; and
   wherein the valid exponent range corresponds to the eight exponent bits.

7. A method for performing a mixed precision estimate, which avoids a need for a normalization and denormalization circuit, the method comprising:
   receiving, by a processing circuit, a floating-point input of a wide precision having a wide precision value;
   computing, by the processing circuit, a floating-point output of an estimate operation in an output exponent range corresponding to a narrow precision value based on the input having the wide precision value;
   based on the input having the wide precision value with an input exponent failing to adhere to a valid exponent range of a valid single precision value, generating a mantissa mask based on the input exponent to be applied to a mantissa of the output;
   generating, by the processing circuit, a formatted output by adding an additional exponent bit beyond eight exponent bits to account for the input exponent failing to adhere to the valid exponent range of the valid single precision value, and applying the mantissa mask to the mantissa of the output to reduce mantissa bits according to a degree in which the input exponent fails to adhere to the valid exponent range: and
   storing, by the processing circuit, the formatted output having the narrow precision value in a wide precision format register having an architected register storage format in a wide precision format, wherein the wide precision format register includes extra exponent bits compared to a narrow precision format register having an architected register storage format in a narrow precision format for storing the additional exponent bit.

8. The method of claim 7, further comprising based on the wide precision value of the input having an input exponent failing to correspond to the output exponent range, generating the output as an out of range value.

9. The method of claim 8, wherein the out of range value comprises at least one of zero and infinity.

* * * * *